United States Patent Office.

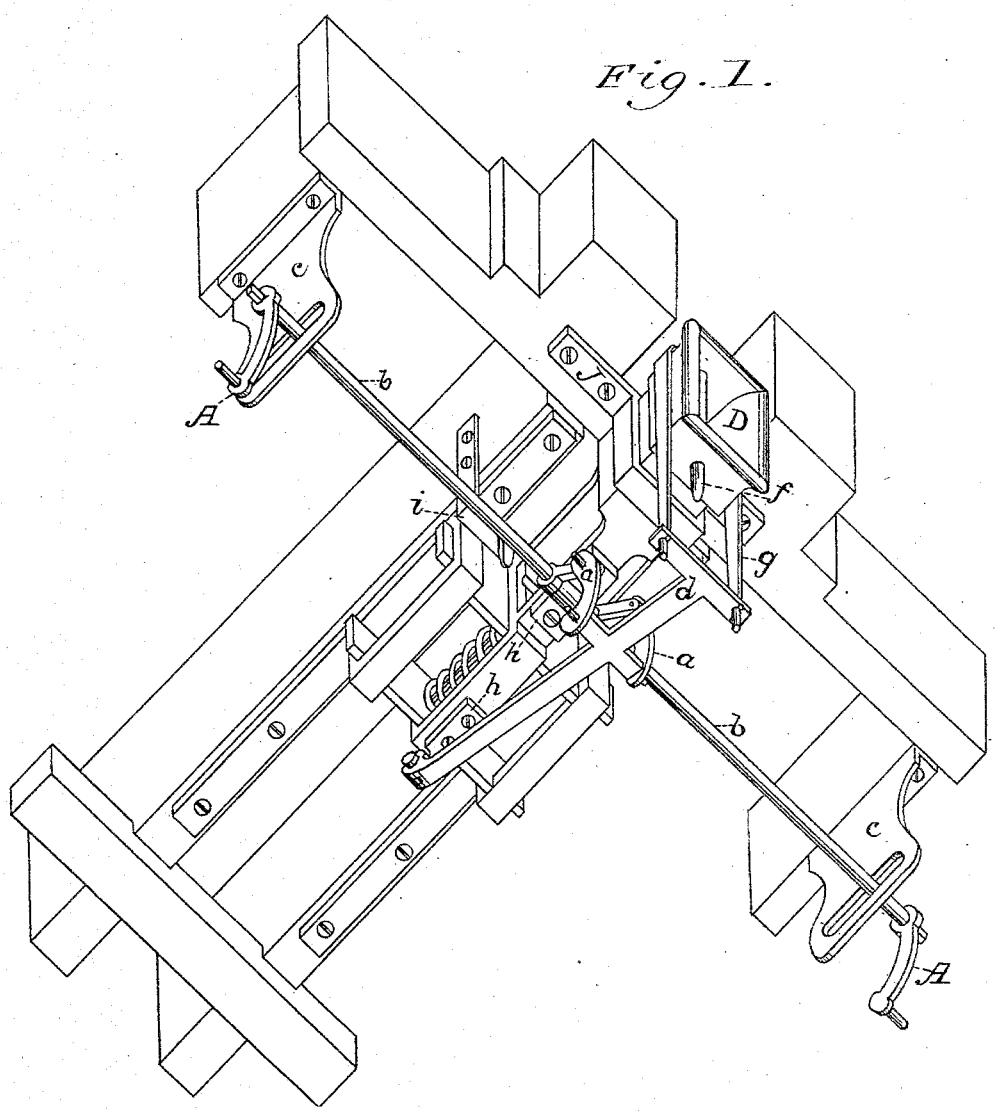

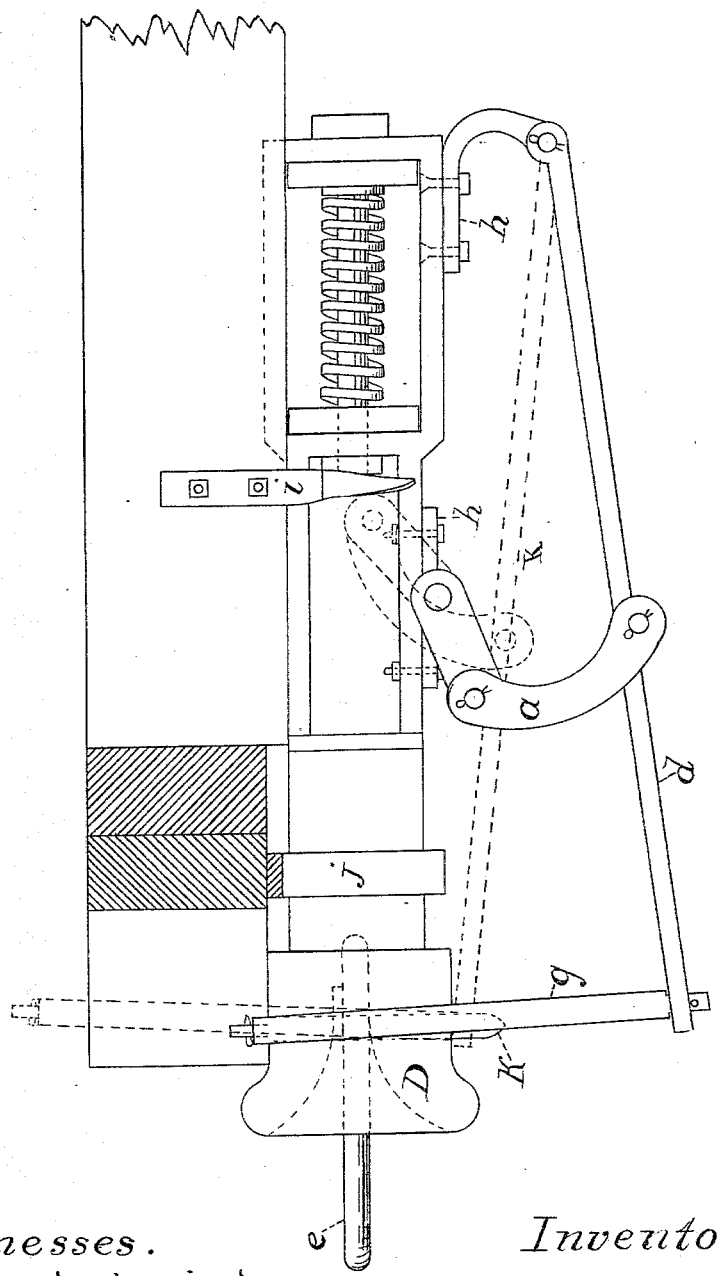

MARVIN PORTER, OF BINGHAMTON, NEW YORK.

CAR-COUPLING.

SPECIFICATION forming part of Letters Patent No. 304,028, dated August 26, 1884.

Application filed June 21, 1884. (No model.)

*To all whom it may concern:*

Be it known that I, MARVIN PORTER, a citizen of the State of New York, residing at Binghamton, in the county of Broome and State of New York, have invented certain new and useful Improvements in Railroad-Car Couplers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in a railroad-car coupler in which the machinery is attached to the draw-head on the under side, having a lever to raise and lower the coupling-pin attached to a gate, so that the coupling-pin is raised or lowered and passes through the eye in the draw-head—the lever being operated by means of cams raised and lowered by a shaft attached thereto, and extending across and under the car-body to both sides of the car, and resting in loops fastened to the sides of the car-body, and stops are attached to the horizontal car-beams near the draw-head, for the purpose of unlocking the cams attached to the draw-head, so that the coupling-pin will drop into its place. The coupling attachment applied to the draw-head is so arranged as to move with the draw-head, and is operated as a coupler on either side of the car.

The object of my improvement is to provide a useful and safe railroad-car coupler, whereby railroad-cars can be coupled and uncoupled by a person standing on either side of the car, and thereby avoid entering between the cars for that purpose. I attain this object by the mechanism illustrated in the accompanying drawings.

Figure 1 is an isometrical view of the entire attachment to the draw-head. Fig. 2 is a longitudinal view of the attachment to the draw-head. The dotted lines in Fig. 2 show the coupling-pin when it is raised. The full lines show the position of the pin when the cars are coupled.

Similar letters refer to similar parts throughout the two views, except the capital letter D, which refers to the draw-head.

In Fig. 1, small letter $d$ shows the lever, which is fastened to the back end of the draw-head. The lever is united to the gate $g$, which carries the pin $f$, to which it is attached. The lever $d$ is moved by means of the cams $a\ a$ and $A\ A$, attached to the shaft $b\ b$, passing through the loop $c\ c$, and $i\ i$ show the stops used to unlock the cams $a\ a$, and $h\ h$ show the points of attachment of the machinery to the draw-head. In Fig. 2, $j$ represents the stirrups which support the draw-head. $e$ shows coupling-link.

I am aware that prior to my invention railroad-car couplers have been made having a lever with gate and pin attachment, but fastened to the body of the car. I therefore do not claim such combination, broadly; but

What I claim as my invention, and desire to secure by Letters Patent, is—

The mechanical construction and combination in a railroad-car coupler attached to the draw-head, and moving with the draw-head, having the lever $d$, with gate $g$ and pin $f$, united together and moved by means of the cams $a\ a$, attached to the shafts $b\ b$, held in position by the loops $c\ c$, and the cams unlocked by the stops $i\ i$, and operated from either side of the car, all substantially as set forth.

In testimony whereof I have affixed my signature, in presence of two witnesses, May 27, A. D. 1884.

MARVIN PORTER.

Witnesses:
ERWIN A. WIGGINS,
ARTHUR W. T. BACK.